US010425228B2

(12) United States Patent
Androulaki et al.

(10) Patent No.: US 10,425,228 B2
(45) Date of Patent: *Sep. 24, 2019

(54) RECEIPT, DATA REDUCTION, AND STORAGE OF ENCRYPTED DATA

(71) Applicant: International Business Machines Corporation, Armonk, NY (US)

(72) Inventors: Elli Androulaki, Arianestrasse (CH); Nathalie Baracaldo, Pittsburgh, PA (US); Joseph S. Glider, Palo Alto, CA (US); Alessandro Sorniotti, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/445,174

(22) Filed: Feb. 28, 2017

(65) Prior Publication Data

US 2017/0170961 A1 Jun. 15, 2017

Related U.S. Application Data

(63) Continuation of application No. 15/161,881, filed on May 23, 2016, now Pat. No. 9,667,422, which is a
(Continued)

(51) Int. Cl.
*H04L 9/16* (2006.01)
*G06F 12/14* (2006.01)
(Continued)

(52) U.S. Cl.
CPC ............ *H04L 9/16* (2013.01); *G06F 12/1408* (2013.01); *H04L 9/0822* (2013.01);
(Continued)

(58) Field of Classification Search
CPC ....... H04L 9/16; H04L 9/0822; H04L 9/0861; H04L 9/0891; H04L 9/14; H04L 2209/24;
(Continued)

(56) References Cited

U.S. PATENT DOCUMENTS 5,684,876 A 11/1997 Pinder et al.
5,757,571 A 5/1998 Basham et al.
(Continued)

OTHER PUBLICATIONS

Kim et al, "An Energy-Efficient Selective Encryption Scheme for Wireless Multimedia Sensor Networks," Dec. 2012, pp. 499-505.
(Continued)

*Primary Examiner* — Shahriar Zarrineh
(74) *Attorney, Agent, or Firm* — Lieberman & Brandsdorfer, LLC

(57) ABSTRACT

Embodiments relate to processing streams of encrypted data received from multiple users. A received encrypted data stream is separated into one or more encrypted data chunks, placing the data chunk(s) into a sub-stream, and decrypting the data chunks into plaintext. One or more advanced data functions are applied to the plaintext, thereby effectively transforming the plaintext. The transformed plaintext is organized into one or more data units, and each data unit is encrypted with a wrapped encryption key. The aspect of encrypting the data unit includes creating a fixed size encryption unit, whereby the wrapped encryption key comprises a master key and a private key.

17 Claims, 8 Drawing Sheets

Related U.S. Application Data continuation of application No. 14/470,332, filed on Aug. 27, 2014, now Pat. No. 9,397,833.

(51) Int. Cl.
*H04L 9/14* (2006.01)
*H04L 9/08* (2006.01)

(52) U.S. Cl.
CPC .......... *H04L 9/0861* (2013.01); *H04L 9/0891* (2013.01); *H04L 9/14* (2013.01); *G06F 2212/1052* (2013.01); *G06F 2212/402* (2013.01); *H04L 2209/24* (2013.01); *H04L 2209/30* (2013.01)

(58) Field of Classification Search
CPC ............. G06F 21/6218; G06F 21/6227; G06F 21/6236; G06F 21/6245; G06F 21/6254; G06F 21/6263; G06F 21/6272; G06F 21/6281; G06F 21/629; G06F 12/1408; G06F 2212/1052; G06F 2212/402
USPC ........................................................ 713/193
See application file for complete search history.

(56) References Cited

U.S. PATENT DOCUMENTS

| | | | |
|---|---|---|---|
| 5,805,699 A | 9/1998 | Akiyama et al. | |
| 5,938,734 A | 8/1999 | Yao et al. | |
| 6,341,164 B1 | 1/2002 | Dilkie et al. | |
| 6,378,071 B1* | 4/2002 | Sasaki | G06F 17/30067 707/E17.005 |
| 6,760,779 B1* | 7/2004 | Riceman | H04L 1/0057 709/246 |
| 7,155,605 B1* | 12/2006 | Cromer | G06F 21/6263 713/151 |
| 7,194,620 B1 | 3/2007 | Hayes | |
| 7,254,838 B2 | 8/2007 | Kim et al. | |
| 7,362,859 B1* | 4/2008 | Robertson | H04L 9/0637 380/29 |
| 7,487,363 B2 | 2/2009 | Alve | G06F 21/10 713/150 |
| 7,965,844 B2 | 6/2011 | Greco et al. | |
| 8,320,560 B2 | 11/2012 | Orsini et al. | |
| 8,379,845 B2 | 2/2013 | Gondkar et al. | |
| 8,401,185 B1* | 3/2013 | Telang | H04L 67/1095 380/44 |
| 8,477,946 B2* | 7/2013 | Funk | G06F 12/1408 380/277 |
| 8,479,304 B1 | 7/2013 | Clifford | |
| 8,650,157 B1 | 2/2014 | Jha et al. | |
| 8,656,167 B2* | 2/2014 | Bono | H04L 63/0428 713/170 |
| 8,782,441 B1 | 7/2014 | Osterwalder et al. | |
| 8,914,632 B1 | 12/2014 | Shankar et al. | |
| 9,037,870 B1 | 5/2015 | Zheng et al. | |
| 9,081,771 B1 | 7/2015 | Faibish et al. | |
| 2003/0051151 A1* | 3/2003 | Asano | G11B 20/00086 713/193 |
| 2004/0156508 A1* | 8/2004 | Tada | H04L 9/0822 380/281 |
| 2004/0177267 A1 | 9/2004 | Tada et al. | |
| 2004/0250066 A1* | 12/2004 | Di Luoffo | G06Q 20/341 713/168 |
| 2004/0255133 A1 | 12/2004 | Lei et al. | |
| 2005/0169465 A1* | 8/2005 | Itani | H04L 9/0656 380/42 |
| 2005/0249348 A1 | 11/2005 | Fujimoto et al. | |
| 2006/0177053 A1 | 8/2006 | Ohno | |
| 2006/0271547 A1* | 11/2006 | Chen | G06F 16/1844 |
| 2008/0077806 A1 | 3/2008 | Cui et al. | |
| 2008/0317246 A1 | 12/2008 | Manders et al. | |
| 2009/0138574 A1* | 5/2009 | Hui | G06F 21/6218 709/219 |
| 2009/0190760 A1 | 7/2009 | Bojinov et al. | |
| 2009/0214040 A1* | 8/2009 | Funk | H04L 9/088 380/277 |
| 2009/0296926 A1 | 12/2009 | Perlman | |
| 2009/0323940 A1 | 12/2009 | Moffat et al. | |
| 2009/0327751 A1* | 12/2009 | Koifman | G06F 3/0623 713/189 |
| 2010/0083003 A1* | 4/2010 | Spackman | G06F 21/6209 713/193 |
| 2010/0115286 A1 | 5/2010 | Hawkes et al. | |
| 2010/0162001 A1 | 6/2010 | Dodgson | |
| 2010/0198797 A1 | 8/2010 | Wideman et al. | |
| 2010/0306412 A1 | 12/2010 | Therrien et al. | |
| 2010/0313036 A1 | 12/2010 | Lumb | |
| 2011/0022718 A1 | 1/2011 | Evans et al. | |
| 2011/0102546 A1 | 5/2011 | Dhuse et al. | |
| 2011/0167221 A1 | 7/2011 | Pangal et al. | |
| 2011/0170687 A1 | 7/2011 | Hyodo et al. | |
| 2011/0320805 A1 | 12/2011 | Chaves et al. | |
| 2012/0084523 A1 | 4/2012 | Littlefield et al. | |
| 2012/0089829 A1* | 4/2012 | Kholidy | H04L 9/065 713/153 |
| 2012/0134494 A1* | 5/2012 | Liu | G06F 21/6218 380/44 |
| 2012/0151222 A1 | 6/2012 | Koffman et al. | |
| 2012/0159175 A1* | 6/2012 | Yocom-Piatt | G06F 11/1453 713/176 |
| 2012/0166745 A1 | 6/2012 | Retnamma et al. | |
| 2012/0195425 A1 | 8/2012 | Kim et al. | |
| 2012/0204024 A1* | 8/2012 | Augenstein | G06F 11/1453 713/150 |
| 2012/0243688 A1 | 9/2012 | Hirsh | |
| 2012/0303893 A1 | 11/2012 | Benhase et al. | |
| 2012/0331088 A1* | 12/2012 | O'Hare | G06F 21/6227 709/214 |
| 2013/0013931 A1* | 1/2013 | O'Hare | H04L 9/0822 713/189 |
| 2013/0103945 A1 | 4/2013 | Cannon et al. | |
| 2013/0262868 A1 | 10/2013 | Friedman et al. | |
| 2013/0305037 A1 | 11/2013 | Puttaswamy Naga et al. | |
| 2013/0305039 A1* | 11/2013 | Gauda | G06F 21/6218 713/153 |
| 2013/0311789 A1 | 11/2013 | Johnson et al. | |
| 2014/0013112 A1* | 1/2014 | Cidon | G06F 21/6218 713/165 |
| 2014/0025948 A1 | 1/2014 | Bestler et al. | |
| 2014/0032925 A1 | 1/2014 | Panchbudhe et al. | |
| 2014/0040616 A1 | 2/2014 | Barber et al. | |
| 2014/0082376 A1 | 3/2014 | Roden et al. | |
| 2014/0095892 A1 | 4/2014 | Lai et al. | |
| 2014/0189348 A1 | 7/2014 | El-Shimi et al. | |
| 2014/0281146 A1* | 9/2014 | Horn | G06F 3/064 711/103 |
| 2014/0281486 A1* | 9/2014 | Nayshtut | G06F 21/6227 713/153 |
| 2014/0358870 A1* | 12/2014 | Chambliss | G06F 16/1748 707/692 |
| 2014/0359276 A1 | 12/2014 | Resch et al. | |
| 2015/0026464 A1 | 1/2015 | Hanner et al. | |
| 2015/0220429 A1* | 8/2015 | Cypher | G06F 11/2094 711/170 |
| 2015/0236850 A1* | 8/2015 | Furukawa | H04L 9/0822 380/281 |
| 2015/0293817 A1 | 10/2015 | Subramanian et al. | |
| 2015/0331610 A1* | 11/2015 | Slik | G06F 3/0608 711/166 |

OTHER PUBLICATIONS

Osuna et al., "Implementing IBM Storage Data Deduplication Solutions," IBM Redbooks, Mar. 2011, pp. 1-322, First Edition.

Wang et al., "Deduplication-Oriented Backup-Data Encryption Method," Journal of Computer Applications, Jul. 2010, pp. 1-5, vol. 30, No. 7.

Wang et al., "A Novel Encryption Scheme for Data Deduplication System," School of Computer Science and Engineering, University

(56) References Cited

OTHER PUBLICATIONS of Electronic Science and Technology of China, Chengdu, China, 2010, pp. 265-269.

Unknown, "Security for Shared Data Spaces," An IP.com Prior Art Database Technical Disclosure, Jul. 30, 2007, pp. 1-16.

Internet Society et al., "Telnet Data Encryption Option (RFC2946)", An IP.com Prior Art Database Technical Disclosure, Sep. 1, 2000, pp. 1-10.

List of IBM Patents or Applications Treated as Related, Feb. 2017.

\* cited by examiner

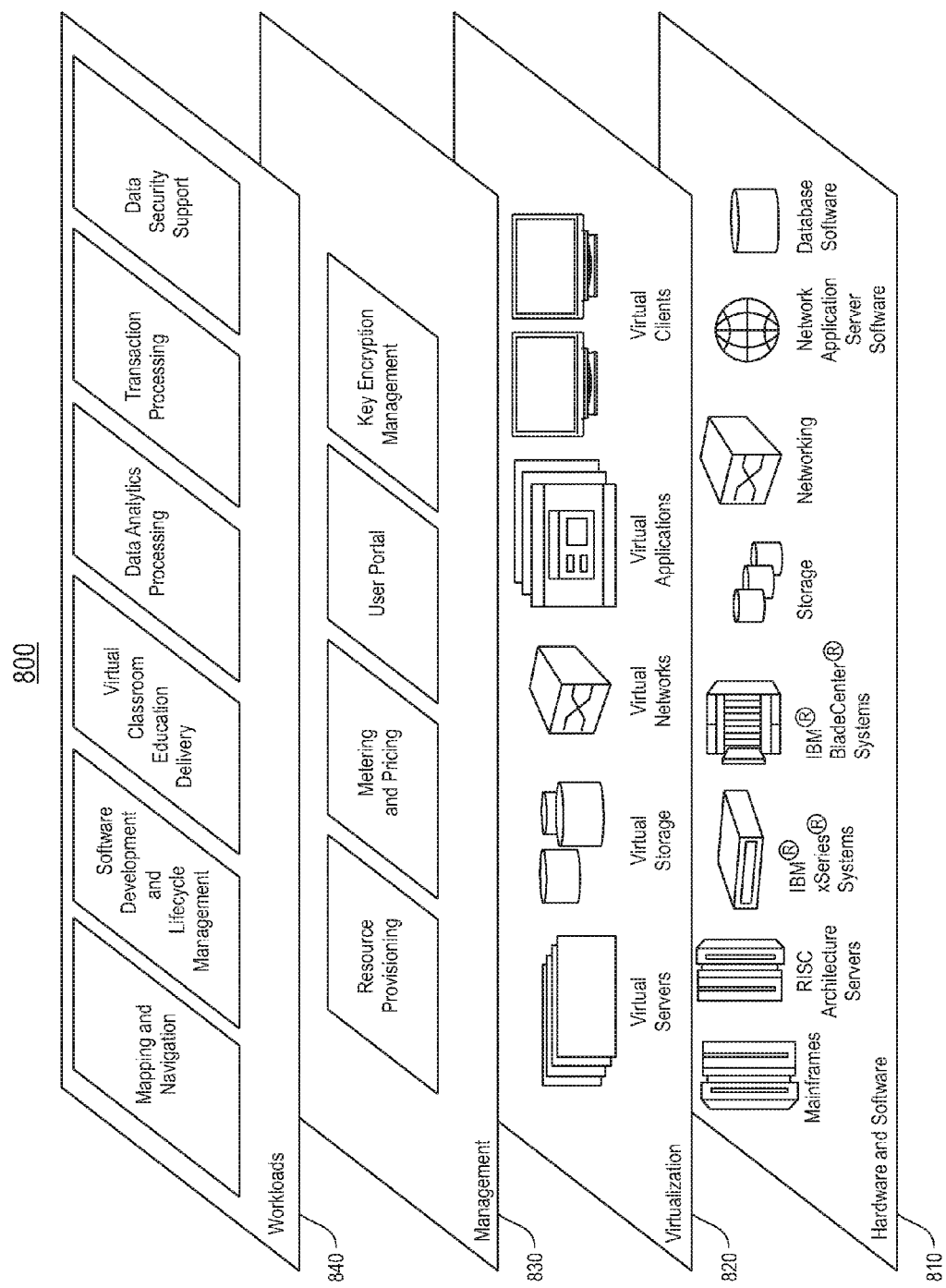

RECEIPT, DATA REDUCTION, AND STORAGE OF ENCRYPTED DATA

CROSS-REFERENCE TO RELATED APPLICATION(S)

This application is a continuation patent application claiming the benefit of the filing date of U.S. patent application Ser. No. 15/161,881, filed on May 23, 2016 and titled "Receipt, Data Reduction, and Storage of Encrypted Data", now pending, which is a continuation of U.S. patent application Ser. No. 14/470,332, filed on Aug. 27, 2014 and titled "Receipt, Data Reduction, and Storage of Encrypted Data", now U.S. Pat. No. 9,397,833, both of which are hereby incorporated by reference.

BACKGROUND

The present invention relates to encryption and confidentiality of data on an external data storage system. More specifically, the invention relates to data reduction, including compression and de-duplication associated with storing encrypted data on the external storage system.

End-to-end encryption is the process of encrypting data close to the source before committing the encrypted data to storage. This encryption process has become increasingly prevalent due to security concerns regarding third party storage or cloud providers, domain specific regulations mandating the encryption of sensitive data, ensuring secure deletion of data, and encryption requirements in high-security data centers. The client is the only entity in control of keys used to encrypt the data. Accordingly, no information is revealed to the cloud provider or other cloud provider tenants.

Encrypting data is limiting however, in that the majority of storage efficiency functions do not achieve their intended functions when operating on encrypted data. Encrypting data maximizes the entropy of ciphertext. As a consequence, encrypted data cannot be compressed. Furthermore, semantically secure encryption of the same content in two different files or two different locations results in different ciphertexts, resulting in the failure of standard deduplication attempts.

SUMMARY

The invention includes a system, computer program product, and method for encrypting streams of data, and more specifically, to individually decrypt units of data organized into data chunks.

In one aspect, a computer system for encrypting data streams is provided. The computer system comprises a decrypter and a module, both in communication with a hardware processor. The decrypter separates a received encrypted data stream into one or more encrypted data chunks, places the data chunk(s) into a sub-stream, and decrypts the data chunk(s) into plaintext. The module effectively transforms the plaintext through application of an advanced data function(s). The module organizes the transformed plaintext into a data unit, and encrypts the data unit with a wrapped encryption key. Encrypting the data unit includes creating a fixed size encryption unit, whereby the wrapped encryption key comprises a master key and a private key.

In another aspect, a computer program product is provided for encrypting data streams. The computer program product comprises computer readable storage device having program code embodied therewith, the program code is executable by a processing unit to separate a received encrypted data stream into one or more encrypted data chunks. Program code is provided to place the data chunk(s) into a sub-stream and decrypt the data chunk(s) into plaintext. One or more advanced data functions are applied to the plaintext, thereby creating transformed plaintext. Program code is provided to organize the transformed plaintext into a data unit, and to encrypt the data unit with a wrapped encryption key. The program code to encrypt the data unit includes instruction to create a fixed size encryption unit, whereby the wrapped encryption key comprises a master key and a private key.

In yet another aspect, a method is provided for encrypting data streams. A received encrypted data stream is separated into one or more encrypted data chunks. The data chunk(s) is placed into a sub-stream and decrypted into plaintext. One or more advanced data functions are applied to the plaintext, effectively transforming the plaintext. The transformed plaintext is organized into a data unit, which is then subject to encryption. The data unit is encrypted with a wrapped encryption key. Encrypting the data unit includes creating a fixed size encryption unit, whereby the wrapped encryption key comprises a master key and a private key.

Other features and advantages of this invention will become apparent from the following detailed description of the presently preferred embodiment(s) of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

FIG. 8 depicts a set of functional abstraction layers provided by the cloud computing environment.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment", "one embodiment," or "an embodiment" means that a particular feature, structure, or characteristic described in connection with the embodiment is included in at least one embodiment of the present invention. Thus, appearances of the phrases "a select embodiment", "in one embodiment", or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A decrypter, as described hereafter, is a component within a data path between an application generating and/or using data and a persistent medium where generated and/or used data is stored. In one embodiment, the decrypter is contained within a compute node, wherein the compute node is a physical or logical entity. The decrypter, when granted permission, has access to encryption keys and metadata containing sufficient information pertaining to ciphertext to allow for decryption. Furthermore, the decrypter has the ability to obtain one or more decryption key(s) required to decrypt into plaintext the transmitted ciphertext, i.e. the encrypted version of the data block(s). Once the original plaintext is available, the decrypter can operate on the plaintext directly, to perform required storage efficiency functions or other functions which require the data to be in an unencrypted form. In one embodiment, the decrypter does not require any modification to an encryption algorithm. In another embodiment, the decrypter is placed downstream with respect to where the encryption was first performed, and does not require relocation of the component performing encryption. Accordingly, in one embodiment, the decrypter is a secure component or module in which data is prepared for storage in a persistent device, e.g. back-end storage, or passed to another data processing component.

Figure 1:
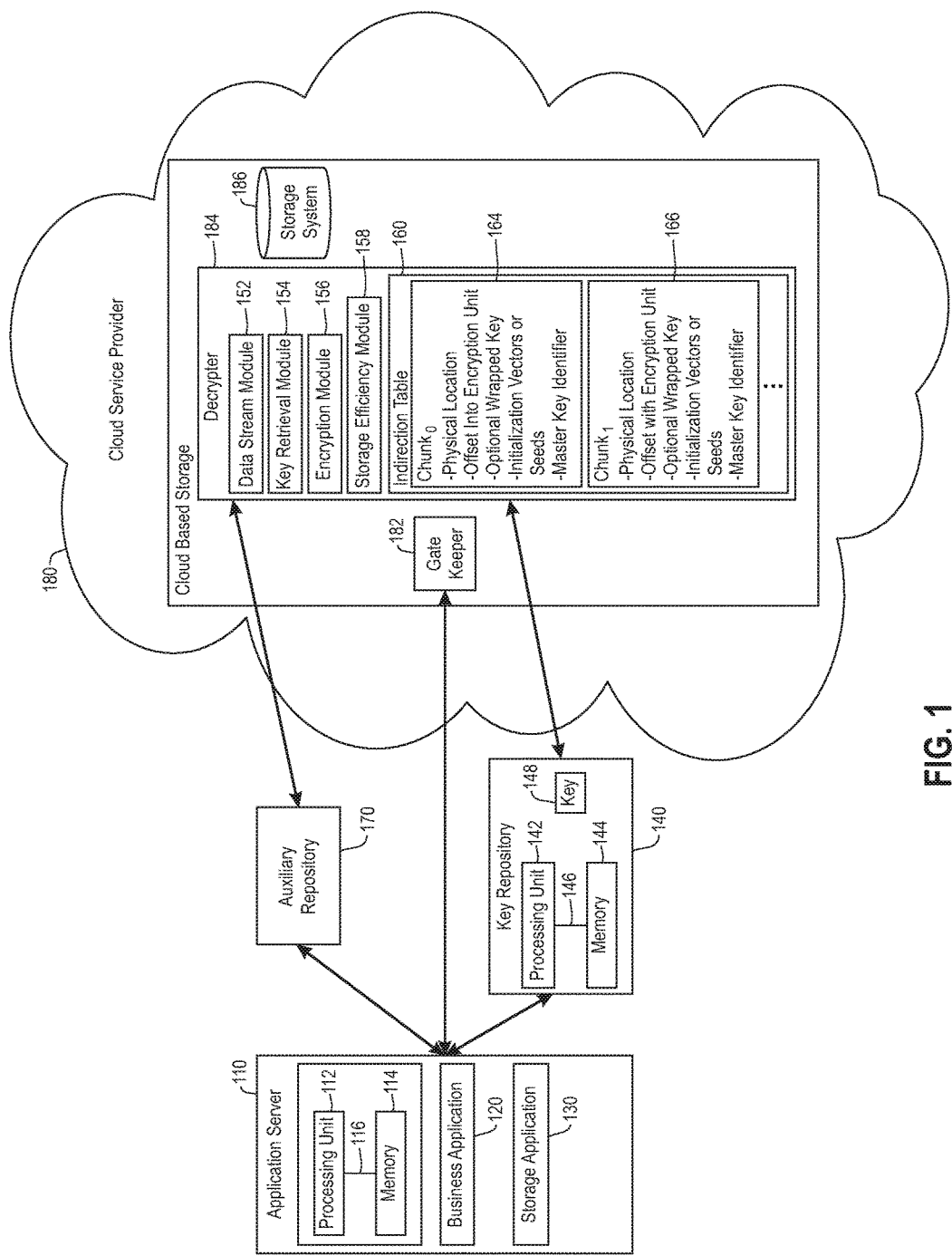
FIG. 1 depicts a block diagram illustrating components embedded in a computer system to support a technique for efficiently storing encrypted data according to an embodiment of the present invention.

FIG. 1 is a block diagram (100) illustrating components embedded in a computer system to support a technique for efficiently storing encrypted data, and in one embodiment to enable de-duplication or compression of encrypted data. There are two primary components shown herein, including an application server (110), and a provider for a shared pool of resources (180), also referred to herein as a cloud service provider. The application server (110) is comprised of four sub-components, including a business application (120), a storage application (130), a key repository (140) and an auxiliary repository (170). The business application (120) generates data that is to be outsourced. In one embodiment, the data generated by the business application (120) is outsourced to a cloud based storage system, e.g. data storage in communication with the shared pool of resources (180), and the storage application (130) serves as an intermediary between the business application (120) and the cloud service provider (180), receiving storage requests such as read or write requests from the business application (120), possibly encrypting the data to be stored and decrypting data being read, deciding where the data is to be stored or fetching it where it had been stored, and creating appropriate requests to the cloud service provider (180) to cause data to be stored or read. The key repository (140) maintains master keys for data encryption, and in one embodiment, functions to provide user authentication prior to distribution of one or more keys to a requesting entity. In one embodiment, a master key is uniquely owned and controlled by an owning entity running a business application (120), and the key repository (140) ensures that the keys are properly distributed through authentication, thereby ensuring that the data is both protected from unauthorized access and available to authorized entities. In one embodiment, encryption is an algorithm or process that converts data (i.e., plaintext) to encrypted data (i.e., ciphertext), and a correct decryption algorithm reverses the work of the encryption algorithm. In one embodiment, the storage application (130) fetches the appropriate master key from the key repository (140) for encryption of data prior to storage. Similarly, in another embodiment, the data is encrypted using a data object key, or private key, selected by the storage application, and the private key is wrapped in the master key fetched from the key repository (140), i.e. encrypted with the master key, and stored in metadata and the auxiliary repository.

Once data is encrypted, the auxiliary repository (170) maintains metadata concerning the encryption used for each part of uploaded data, possibly including information needed to identify the key repository where the master key is stored, the encryption type, and seeds or initialization vectors used in the encryption algorithm. In one embodiment, each time the storage application (130) encrypts data, the auxiliary repository (170) receives an update with corresponding metadata. Accordingly, the storage application (130) component in the application server (110) functions to encrypt data to maintain confidentiality of the encrypted data.

The shared pool of resources (180) is comprised of three primary components, including a gatekeeper (182), a decrypter (184), and persistent storage device(s) (186). The gatekeeper (182) functions as an interface between the application server (110) and the decrypter (184). In one embodiment, the gatekeeper (182) intercepts data storage requests and performs a first level of access authorization to a requested resource. All valid requests are forwarded from the gatekeeper (182) to the decrypter (184). The functionality of processing read and write requests is performed by the decrypter (184). For write requests, the decrypter (184) decrypts received data, de-duplicates the data, compresses the data, encrypts the transformed data, and forwards the re-encrypted data to persistent storage (186). For a read request, the decrypter (184) retrieves the compressed and/or de-duplicated data from persistent storage (186), decrypts the data, re-inflates the data, re-encrypts it, and sends the processed data to the requesting entity. The decrypter (184) communicates with both the key repository (140) and the auxiliary repository (170) to obtain appropriate information to decrypt and re-encrypt data in support of the received requests.

The application server (110) is provided with a processing unit (112) in communication with memory (114) across a bus (116). The application server (110) is shown with a storage application (130) to support encryption of a file prior to sending the file to a storage file system. In one embodiment, encryption by the storage application (130) includes the use of a master key (148). The master key is stored in the key repository (140), which is shown in communication with the application server (110). The location of the key repository (140) is not restricted. Although in one embodiment, the key repository remains under control of administration by the application server (110).

As shown, the key repository (140) is provided in communication with both the application server (110) and the decrypter (184). In the embodiment shown herein, the key repository (140) is provided with a processing unit (142) in communication with memory (144) across a bus (146). One or more master keys (148), hereinafter referred to as a key, are stored local to the key repository (140), and are employed to encrypt and decrypt data. For illustrative purposes, only one key (148) is shown, although in one embodiment, a plurality of keys may be stored local to the key repository (140). As shown, the key (148) is stored local to memory (144), although in one embodiment, the key (148) may be stored in persistent storage (not shown) local to the key repository (140) or in one or more secure components specifically designed to protect the keys against unauthorized access. In one embodiment, the auxiliary repository (170) is provided in communication with both the application server (110) and the decrypter (184), and at the same time is also separate from the key repository (140).

Streams of written data are received by the gatekeeper (182) and partitioned by the decrypter (184) into smaller segments referred to herein as data chunks, which after advanced functions are applied are further combined into data units. Each data chunk is compressed or de-duplicated and the output data is placed into data units, and following encryption the data units are referred to herein as encryption units. In one embodiment, the data unit has a fixed size. Each data unit can be individually or separately encrypted, retrieved and decrypted. At the same time, the fixed size of the data unit enables efficient space allocation in persistent storage. In one embodiment, a data stream module (152), as described in detail below, assigns or otherwise creates a fixed size for each data unit. Similarly, in one embodiment, the data stream module (152) pads any of the data units that have available space with at least one byte so as to ensure that the data unit is fixed in size. Accordingly, creation of the data chunks from the data stream, and further processing and organizing into data units is employed to enhance manageability with respect to persistent storage space allocation and enhanced efficiency of one or more compression functions which effectively reduces utilization of hardware resources and improves function of machine efficiency of data access.

Encryption units may be decrypted for various reasons and purposes. In one embodiment, the decryption may be in support of a read request. The key which is employed for encryption of the data unit is created by the storage system. In one embodiment, the key is referred to as a private key. The owning entity that created the encryption unit or otherwise has been granted access to the encryption unit has an encryption key, referred to herein as the master key. In one embodiment, the encryption unit may have associated with it a wrapped key as metadata, with the wrapped key being the storage system generated key encrypted with the master key. In one embodiment, the wrapped key is also referred to as a wrapped version of the encryption unit key. Conversely, the wrapped key may be decrypted, also referred to as unwrapped, using the master key associated with the owning entity.

The decrypter (184) includes modules to facilitate functionality with respect to de-duplication and compression of encrypted data to support efficient data storage. As shown, the decrypter (184) includes a data stream module (152), key retrieval module (154), an encryption module (156), a storage efficiency module (158), and an indirection table (160). The data stream module (152) functions to receive and process a data stream. As shown in detail in FIGS. 2-7, the received data stream is an encrypted data stream which is separated into multiple data chunks that are encrypted including the use of different master keys, each associated with a different owning entity. In one embodiment, the process running may result in only one sub-stream. More specifically, the data stream module (152) detects and identifies the owning entity that encrypted the data chunks within the encrypted data stream, and processes and separates the encrypted data chunks based on a master key associated with the owning entity of the data chunk. In addition, the data stream module (152) functions to organize the data blocks in each of the sub-streams into units of a manageable size, referred to herein as data chunks.

The key retrieval module (154) functions to retrieve a master key on behalf of an owning entity of the data stream. The data stream module (152) receives the master key for the encrypted data blocks in the sub-stream from the key retrieval module (154). The encryption module (156) functions to decrypt and encrypt data. The storage efficiency module (158) functions to apply advanced data functions, such as data reduction functions (or the inverse functions) on the data in its plaintext form. In one embodiment, the advanced data functions may include, but are not limited to, deduplication techniques, compression, etc. The storage efficiency module (158) organizes the data chunks by the owning entity into data units. In one embodiment, the encryption module (156) functions to decrypt encrypted data chunks, create private keys, and encrypt plaintext of the associated encryption unit with the created private key, with the formed encryption unit suitable for storage. Similarly, the encryption module (156) may use the master key to create a wrapped key, e.g. encryption of the private key with the master key, and to store the wrapped key as metadata for the underlying encryption unit. The indirection table (160) stores metadata mapping virtual data chunks to encryption units stored in the storage system (186). In the example shown herein, two entries (164) and (166) are shown, although this quantity should not be considered limiting, and in one embodiment, additional entries may be provided in the table (160). Each entry (164) and (166) reflects a data chunk. In the example shown herein, entry$_0$ (164) reflects data_chunk$_0$ and entry$_1$ (166) reflects data_chunk$_1$. Each entry includes data pertaining to the associated data chunk. In one embodiment, each entry includes the physical encryption unit location of the data chunk, an offset of the data chunk within the encryption unit, an optional wrapped key, seeds or initialization vectors used to initialize the encryption algorithm for the encryption unit, and a master key identifier.

As identified above, the data stream module (152), the key retrieval module (154), the encryption module (156), the storage efficiency module (158), and the indirection table (160) are shown residing in the decrypter (184). The modules (152)-(158) and indirection table (160) may reside as hardware components, an in one embodiment, the modules (152)-(158) and indirection table (160) may be implemented as a combination of hardware and software in the shared pool of resources (180). Similarly, in one embodiment, the modules (152)-(158) and indirection table (160) may be combined into a single functional item that incorporates the functionality of the separate items. As shown herein, each of the modules (152)-(158) and indirection table (160) are shown local to the decrypter (184). However, in one embodiment they may be collectively or individually distributed across a shared pool of configurable computer resources and function as a unit to support decryption, data manipulation, and re-encryption. Accordingly, the modules may be implemented as software tools, hardware tools, or a combination of software and hardware tools.

Furthermore, the described features, structures, or characteristics may be combined in any suitable manner in one or more embodiments. Examples of modules have been provided to lend a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The functional unit(s) described above in FIG. 1 has been labeled with modules. A module may be implemented in programmable hardware devices such as field programmable gate arrays, programmable array logic, programmable logic devices, or the like. The module(s) may also be implemented in software for processing by various types of processors. An identified module of executable code may, for instance, comprise one or more physical or logical blocks of computer instructions which may, for instance, be organized as an object, procedure, function, or other construct. Nevertheless, the executable of an identified module need not be physically located together, but may comprise disparate instructions stored in different locations which, when joined logically together, comprise the modules and achieve the stated purpose of the modules.

Indeed, a module of executable code could be a single instruction, or many instructions, and may even be distributed over several different code segments, among different applications, and across several memory devices. Similarly, operational data may be identified and illustrated herein within the module, and may be embodied in any suitable form and organized within any suitable type of data structure. The operational data may be collected as a single data set, or may be distributed over different locations including over different storage devices, and may exist, at least partially, as electronic signals on a system or network.

Figure 2:
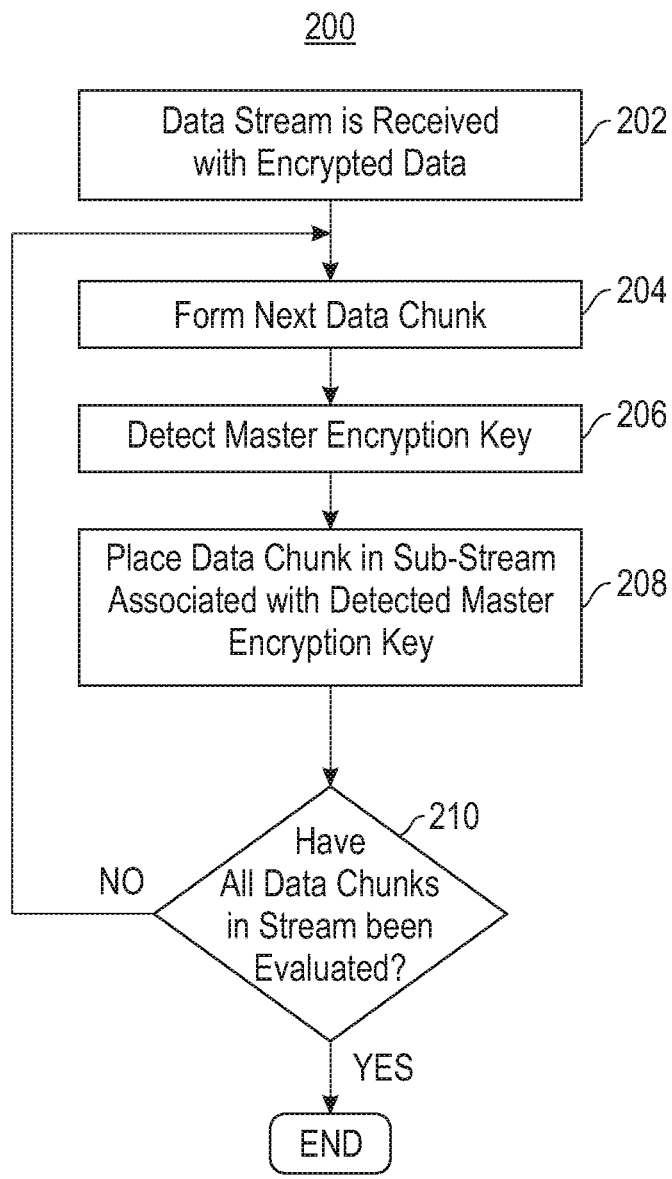
FIG. 2 depicts a flow chart illustrating a process for separating data received in a data stream.

With reference to FIG. 2, a flow chart (200) is provided illustrating a process for separating data received in a data stream. As shown, the data stream comprised of one or more write requests from multiple owners is received with encrypted data (202). Encrypted data in the received data stream is split into data chunks. As each data chunk is formed (204), the master key that was used for encrypting the associated data is detected (206); the master key will be used for decryption of that data chunk. In one embodiment, different data chunks may be encrypted with different master keys, and as such, may be separated for processing by grouping the chunks into sub-streams based on a common master key. Following the detection at step (206), the data chunk formed at step (204) is placed into a sub-stream, and specifically, the sub-stream that is associated with the detected master key (208). Following the placement into an appropriate sub-stream, it is determined if evaluation of data chunks in the received data stream is complete (210). In one embodiment, the evaluation ends at the end of one or a set of write requests. Similarly, in one embodiment, the stream is made up of a set of I/O requests, where the end of each I/O request comprises a natural boundary for processing each stage in a data processing pipeline. A negative response to the determination at step (210) is followed by a return to step (204), and a positive response concludes the separation of the encrypted data stream into sub-streams. In one embodiment, the quantity of data chunks in the received data stream may be increased during processing of the data stream if the size of the data stream increases or continues to grow during the separation process. Accordingly, the encrypted data stream is separated into sub-streams, with the separation qualifier being the master key associated with representative data chunks.

Figure 3:
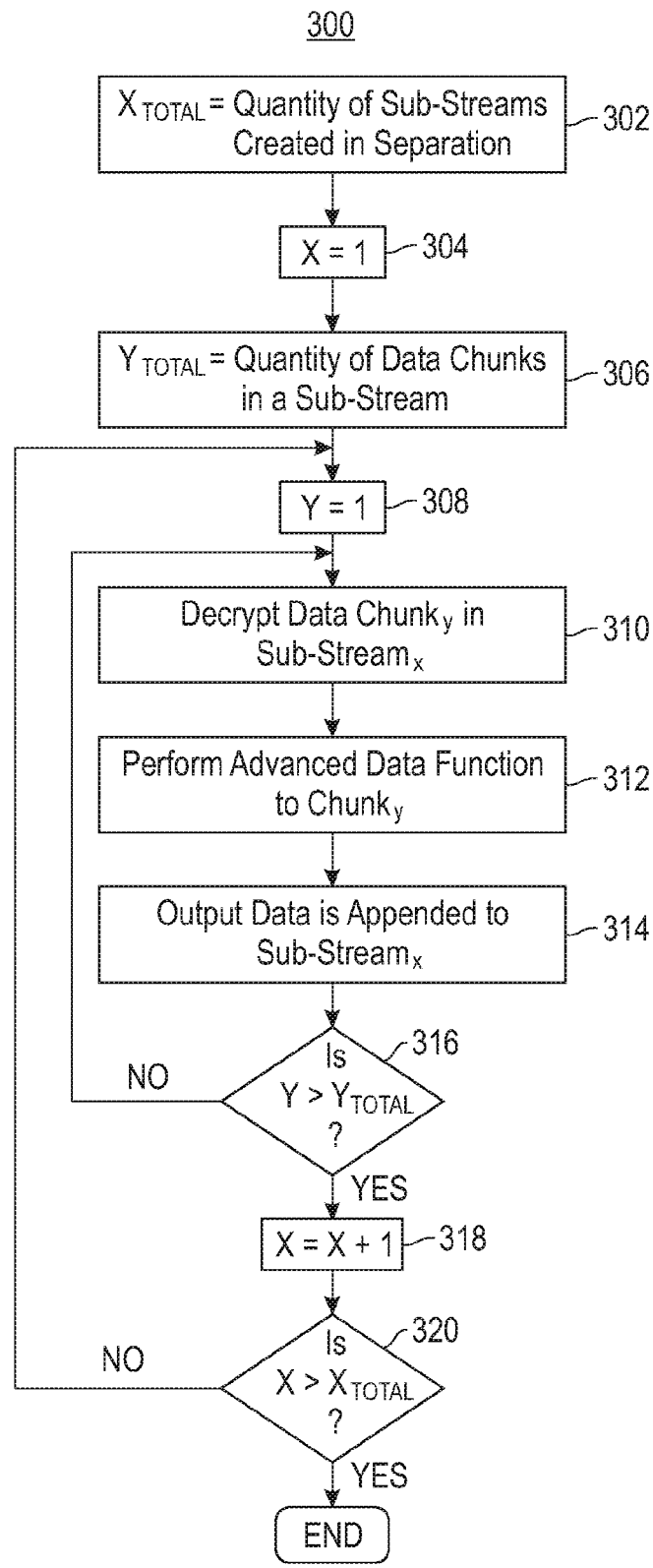
FIG. 3 depicts a flow chart illustrating a process for processing data written into each of the sub-streams.

As shown and described in FIG. 2, the received data stream is comprised of one or more write requests containing encrypted data. Prior to application of an advanced data function on the encrypted data now, the data is formed into chunks and separated into sub-streams, and the encrypted data chunks must be decrypted. Referring to FIG. 3, a flow chart (300) is provided illustrating a process for decrypting data chunks within each of the sub-streams. The variable $X_{Total}$ represents the quantity of sub-streams created in the separation (302), as shown and described in FIG. 2. A sub-stream counting variable, X, is initialized (304). As shown in FIG. 2, each sub-stream has been divided into data chunks. The variable $Y_{Total}$ represents the quantity of data chunks in each one of the sub-streams (306), and an associated data chunk counting variable, Y, is initialized (308). Data chunk$_Y$ in sub-stream$_X$ is decrypted (310). Following the decryption at step (310), an advanced data function is performed on the decrypted data chunk$_Y$ (312). Following step (312), output data is appended to sub-stream$_X$ (314). It is then determined if each of the data chunks in sub-stream$_X$ have been decrypted (316). In one embodiment, at step (316) it is determined if the current value of the variable Y is greater than or equal to the variable $Y_{Total}$. A negative response to the determination at step (316) is followed by a return to step (310), and a positive response is followed by an increment of the sub-stream counting variable (318). It is then determined if decryption of data chunks in each of the sub-streams has been conducted (320). In one embodiment, a data chunk as a whole unit is placed in an encryption unit. Furthermore, in one embodiment, at step (320) it is determined if the current value of the variable X is greater than or equal to the variable $X_{Total}$. A negative response to the determination at step (320) is followed by a return to step (308), and a positive response concludes the per-chunk processing. Accordingly, the encrypted data chunks are decrypted, and one or more advanced data functions are performed on the decrypted data chunks.

Figure 4:
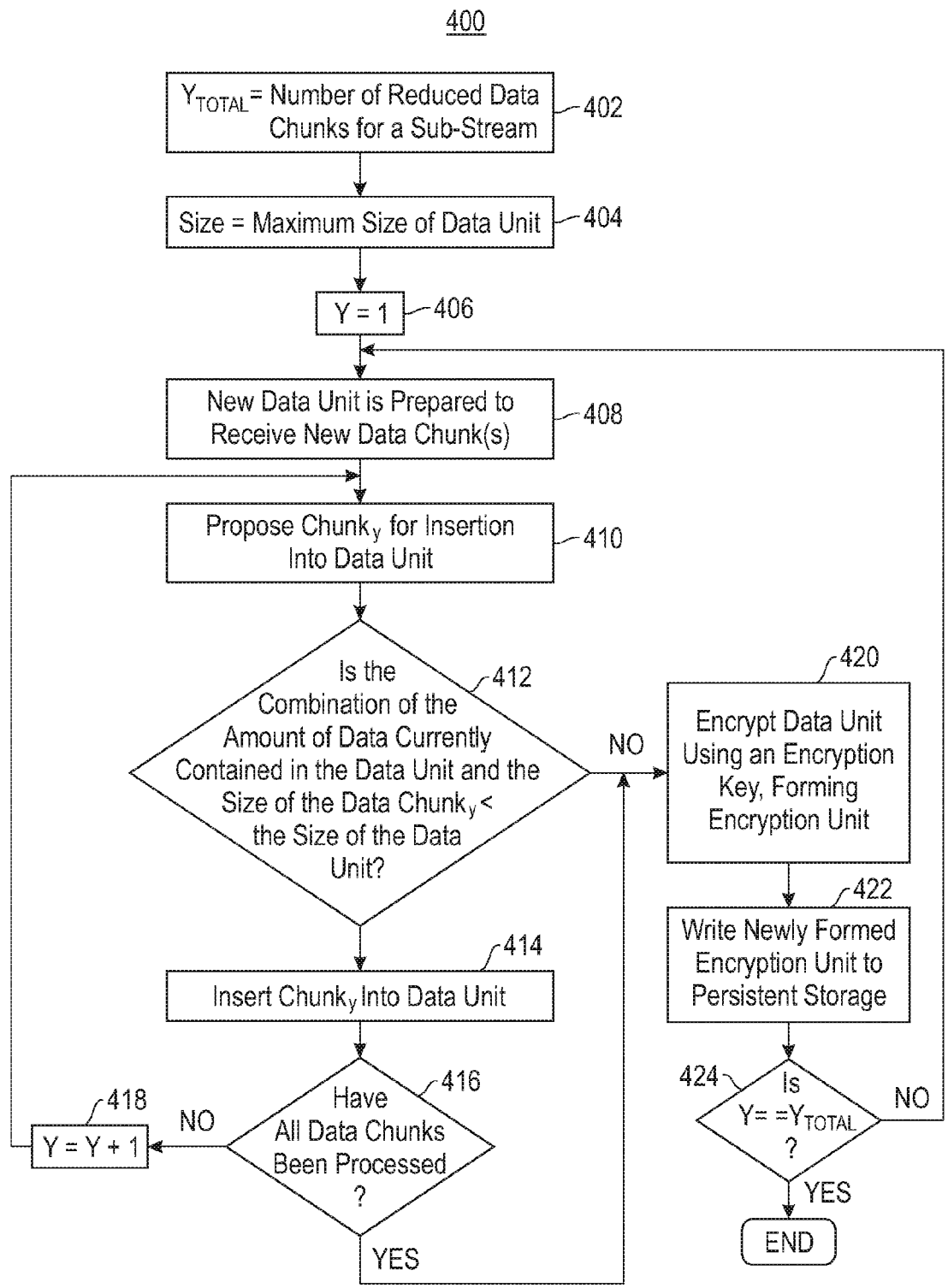
FIG. 4 depicts a flow chart illustrating a process for organizing processed data chunks into data units and formation of encryption units.

To facilitate storage and access of data, the data chunks that have been processed with one or more advanced data functions, as shown in FIG. 3, are re-organized into data units, which when encrypted are referred to as encryption units. Referring to FIG. 4, a flow chart (400) is provided illustrating a process for organizing the processed data chunks for a sub-stream into data units, and formation of encryption units. The variable $Y_{Total}$ is assigned to represent the quantity of reduced data chunks in a sub-stream (402). The variable Size is assigned to represent the maximum size of a data unit (404). The data chunk counting variable, Y, is initialized (406), and a new data unit is prepared to receive new data chunks (408). Following step (408), data chunk$_Y$ is proposed for insertion into the new data unit (410). It is then determined if combination of the amount of data currently contained in the data unit and the size of data chunk$_Y$ is less than the size of the data unit (412). A positive response to the determination at step (412) is an indication that the data unit is not full. The proposed insertion from step (410) is completed (414) and it is determined if all of the data chunks have been processed (416). A negative response to the determination at step (416) is followed by an increment of the data chunk counting variable (418) and a return to step (410). However, a negative response to the determination at step (412) is an indication that the data unit is full. Following a determination that all of the data chunks have been processed or that the data unit is full, the data unit is encrypted including the use of a master key associated with the sub-stream, forming an encryption unit (420). In one embodiment, this encryption includes encrypting the data with a private key and wrapping the private key with the master key associated with the sub-stream. In another embodiment, this encryption may include encrypting the data unit directly with the master key associated with the sub-stream. In another embodiment, the wrapped encryption key is stored as metadata for the encryption unit. Accordingly, for each sub-stream, all of the data chunks are evaluated and inserted into data units, which then are formed into encryption units.

Following step (420), the newly formed encryption unit is written to persistent storage (422). It is then determined if all of the data chunks have been processed (424). In one embodiment, at step (424) it is determined if the current value of the variable Y is greater than or equal to the variable $Y_{Total}$. A negative response to the determination at step (424) is followed by a return to step (408) to continue with formation of data units from the data chunks. However, a positive response to the determination at step (424) demonstrates processing of each of the data chunks is complete. As shown herein, the data chunks are organized into one or more data units, which form individual encryption units when subject to an encryption algorithm. In one embodiment, an individual encryption unit is a fixed size. In one embodiment, any data unit with available space may be padded with one or more bytes to fill available space and to achieve the fixed size. In one embodiment, the added bytes will be encrypted along with the rest of the data placed in the data unit. The processing of the data into encryption units is directed to decrypted data.

Figure 5:
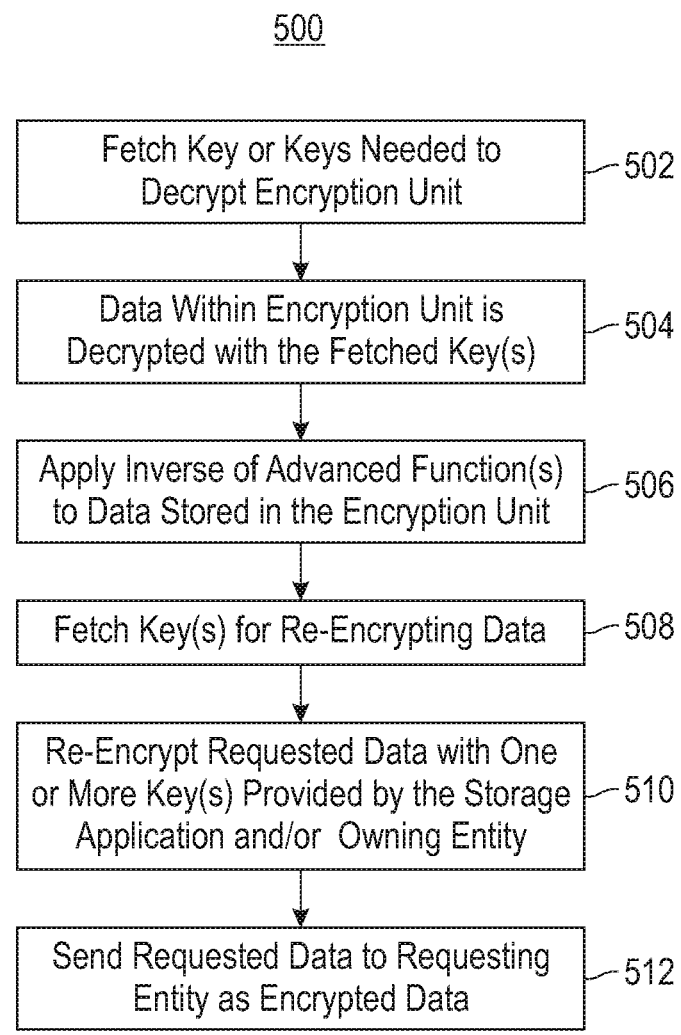
FIG. 5 depicts a flow chart illustrating a process for decrypting an individual or designated encryption unit in support of a read request.

As shown in FIG. 4, each data unit includes one or more data chunks, and following encryption of the data unit, forming an encryption unit. At the same time, individual encryption units may be separately addressed and decrypted. Referring to FIG. 5, a flow chart (500) is provided illustrating a process for decrypting an individual or designated encryption unit in support of a read request. Each encryption unit is associated with a private key that was employed for formation of the encryption unit. The key or key(s) needed to decrypt the encryption unit are fetched (502), and the data within the encryption unit is decrypted using the fetched key(s) (504). Encryption units may be decrypted for various reasons. As shown herein, the encryption unit is decrypted in support of a read request. In one embodiment, the encryption unit subject to the decryption is identified as supporting the read request, e.g. holding the data requested. Following step (504) an inverse of one or more of the advanced functions is applied to the requested data stored in the encryption unit (506). In one embodiment, the data may have been compressed, and the inverse function would be a decompression of the data. After the application at step (506), the key(s) for re-encryption of the data are fetched (508), in one embodiment including the master key and the private key. Requested data is re-encrypted using one or more keys provided by the storage application and/or owning entity (510); the keys having been previously stored in the auxiliary repository and key repository, and the requested data is sent to the requesting entity as encrypted data (512). Accordingly, processing the read request includes decrypting an identified encryption unit supported by the identification of the owning entity.

As described and illustrated herein, the decrypter is supported by the application server, as demonstrated in the system diagram and flow charts. In one embodiment, the functionality of the decrypter may be extrapolated to a cloud computing environment with a shared pool of resources.

Figure 6:
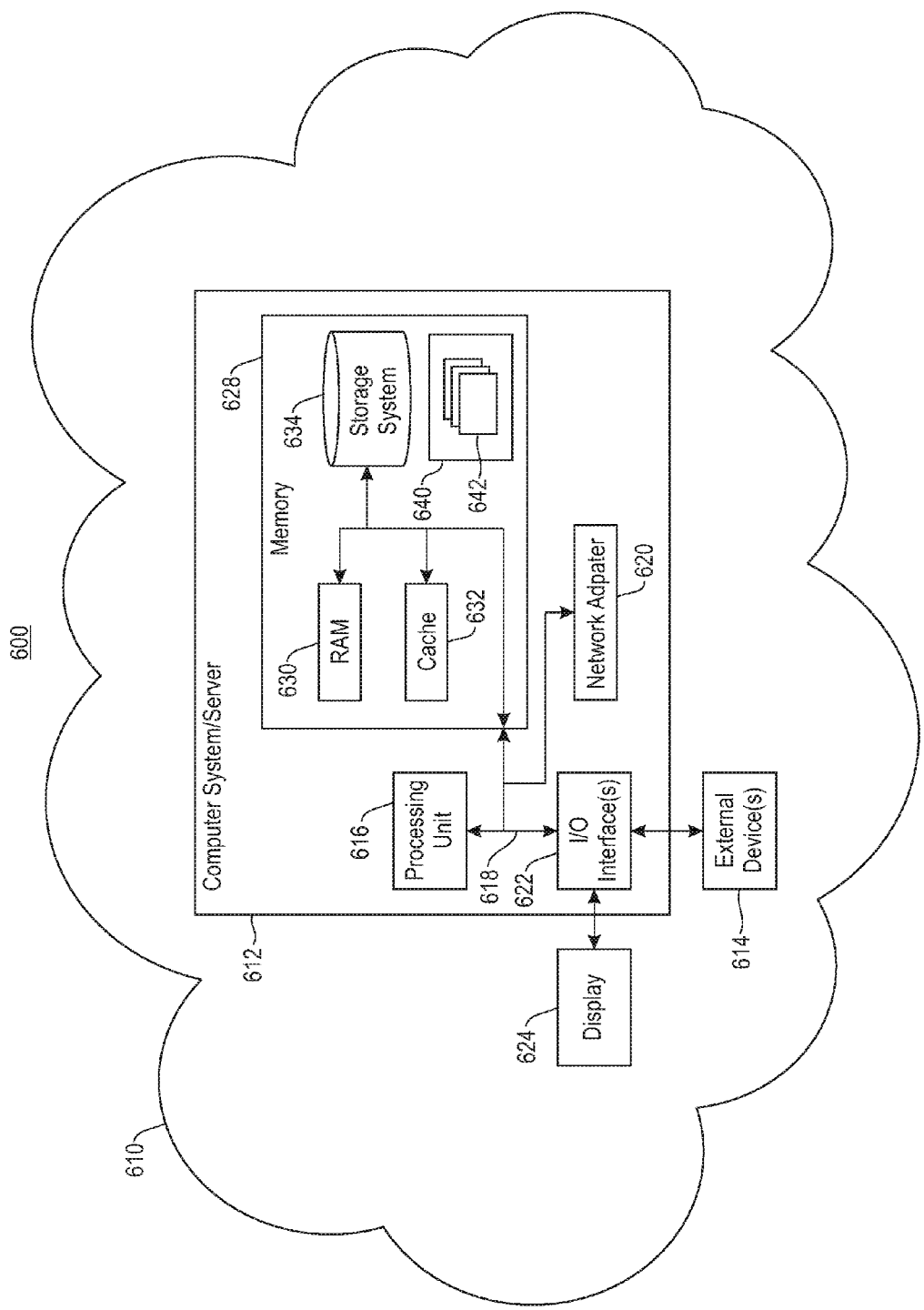
FIG. 6 depicts an example of a cloud computing node.

A cloud computing environment is service oriented with a focus on statelessness, low coupling, modularity, and semantic interoperability. At the heart of cloud computing is an infrastructure comprising a network of interconnected nodes. Referring now to FIG. 6, a schematic of an example of a cloud computing node is shown. Cloud computing node (610) is only one example of a suitable cloud computing node and is not intended to suggest any limitation as to the scope of use or functionality of embodiments of the invention described herein. Regardless, cloud computing node (610) is capable of being implemented and/or performing any of the functionality set forth hereinabove. In cloud computing node (610) there is a computer system/server (612), which is operational with numerous other general purpose or special purpose computing system environments or configurations. Examples of well-known computing systems, environments, and/or configurations that may be suitable for use with computer system/server (612) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (612) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (612) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server (612) in cloud computing node (610) is shown in the form of a general-purpose computing device. The components of computer system/server (612) may include, but are not limited to, one or more processors or processing units (616), system memory (628), and a bus (618) that couples various system components including system memory (628) to processor (616). Bus (618) represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, Video Electronics Standards Association (VESA) local bus, and a Peripheral Component Interconnects (PCI) bus. A computer system/server (612) typically includes a variety of computer system readable media. Such media may be any available media that is accessible by a computer system/server (612), and it includes both volatile and non-volatile media, and removable and non-removable media.

System memory (628) can include computer system readable media in the form of volatile memory, such as random access memory (RAM) (630) and/or cache memory (632). Computer system/server (612) may further include other removable/non-removable, volatile/non-volatile computer system storage media. By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (618) by one or more data media interfaces. As will be further depicted and described below, memory (628) may include at least one program product having a set (e.g., at least one) of program modules that are configured to carry out the functions of embodiments of the invention.

Program/utility (640), having a set (at least one) of program modules (642), may be stored in memory (628) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments of the invention as described herein.

Computer system/server (612) may also communicate with one or more external devices (614), such as a keyboard, a pointing device, a display (624), etc.; one or more devices that enable a user to interact with computer system/server (612); and/or any devices (e.g., network card, modem, etc.) that enables computer system/server (612) to communicate with one or more other computing devices. Such communication can occur via Input/Output (I/O) interfaces (622). Still yet, computer system/server (612) can communicate with one or more networks such as a local area network (LAN), a general wide area network (WAN), and/or a public network (e.g., the Internet) via network adapter (620). As depicted, network adapter (620) communicates with the other components of computer system/server (612) via bus (618). It should be understood that although not shown, other hardware and/or software components could be used in conjunction with computer system/server (612). Examples, include, but are not limited to: microcode, device drivers, redundant processing units, external disk drive arrays, RAID systems, tape drives, and data archival storage systems, etc.

Figure 7:
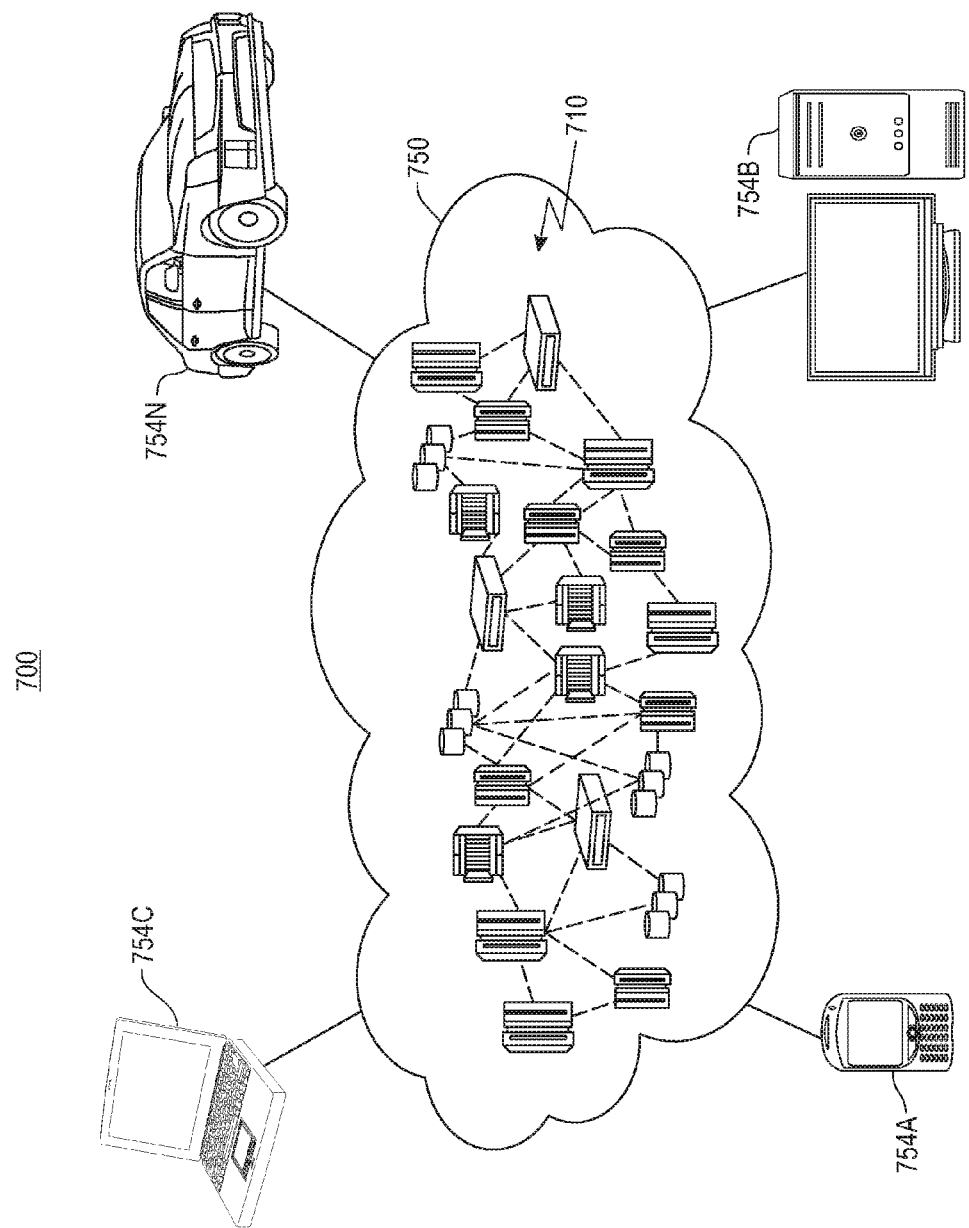
FIG. 7 depicts a cloud computing environment.

Referring now to FIG. 7, illustrative cloud computing environment (750) is depicted. As shown, cloud computing environment (750) comprises one or more cloud computing nodes (710) with which local computing devices used by cloud consumers, such as, for example, personal digital assistant (PDA) or cellular telephone (754A), desktop computer (754B), laptop computer (754C), and/or automobile computer system (754N) may communicate. Nodes (710) may communicate with one another. They may be grouped (not shown) physically or virtually, in one or more networks, such as Private, Community, Public, or Hybrid clouds as described hereinabove, or a combination thereof. This allows cloud computing environment (750) to offer infrastructure, platforms, and/or software as services for which a cloud consumer does not need to maintain resources on a local computing device. It is understood that the types of computing devices (754A)-(754N) shown in FIG. 7 are intended to be illustrative only and that computing nodes (710) and cloud computing environment (750) can communicate with any type of computerized device over any type of network and/or network addressable connection (e.g., using a web browser).

Referring now to FIG. 8, a set of functional abstraction layers provided by cloud computing environment (800) is shown. It should be understood in advance that the components, layers, and functions shown in FIG. 8 are intended to be illustrative only and embodiments of the invention are not limited thereto. As depicted, the following layers and corresponding functions are provided: hardware and software layer (810), virtualization layer (820), management layer (830), and workload layer (840). The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, a management layer (830) may provide the following functions: resource provisioning, metering and pricing, user portal, service level management, and key management. The functions are described below. Resource provisioning provides dynamic procurement of computing resources and other resources that are utilized to perform tasks within the cloud computing environment. Metering and pricing provides cost tracking as resources that are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Key management provides cloud computing and sharing of data among two or more entities such that required encryption and management of associated encrypted data are met.

Workloads layer (840) provides examples of functionality for which the cloud computing environment may be utilized. In the shared pool of configurable computer resources described herein, hereinafter referred to as a cloud computing environment, files may be shared among users within multiple data centers, also referred to herein as data sites. Accordingly, a series of mechanisms are provided within the shared pool to support organization and management of data storage within the cloud computing environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flow chart illustrations and/or block diagrams of methods, apparatus (systems), and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow charts and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function(s)/act(s) specified in the flow chart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The present invention may be a system, a method, and/or a computer program product. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present invention are described herein with reference to flow chart illustrations and/or block diagrams of methods, apparatus (systems), and computer program products according to embodiments of the invention. It will be understood that each block of the flow chart illustrations and/or block diagrams, and combinations of blocks in the flow chart illustrations and/or block diagrams, can be implemented by computer readable program instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the implementation of the wrapped encryption keys associated with one or more encryption units supports management and encryption of data chunks in manageable sizes, and further support separate retrieval of encryption units.

It will be appreciated that, although specific embodiments have been described herein for purposes of illustration, various modifications may be made without departing from the spirit and scope of the invention. In particular, although the embodiments described herein relate to storage efficiency function, in one embodiment, any functions, such as virus scanning, indexing, etc. that are performed on plaintext may be undertaken as an advanced data function. There are alternative embodiments for storage application encryption, one which uses a master key alone to encrypt the data, another uses a specific key per data object wrapped in a master key, and there may be other ways that the storage application encrypts the data. Accordingly, the scope of protection of this invention is limited only by the following claims and their equivalents.

What is claimed is:

1. A computer system comprising:
   a hardware processor in communication with a memory; and
   a hardware decrypter in communication with the hardware processor, the hardware decrypter comprising one or more hardware modules to:
      separate a received encrypted data stream into a plurality of encrypted data chunks;
      place the plurality of data chunks into a sub-stream;
      decrypt the plurality of data chunks into plaintext through a master key;
      apply one or more advanced data functions to the plaintext to create transformed plaintext;
      organize the transformed plaintext into a data unit, wherein the data unit comprises at least a portion of the plurality of data chunks;
      encrypt the data unit with a wrapped encryption key, the wrapped encryption key comprising the master key and a private key, the private key to encrypt the data unit, the master key associated with an owning entity and to encrypt the private key; and
      create a fixed size encryption unit, the wrapped encryption key stored as metadata for the encryption unit, wherein decryption of the data chunk into plaintext, the application of one or more advanced data functions to the plaintext to create transformed plaintext, organization of the transformed plaintext into a data unit, and encryption of the data unit comprises an improvement to an efficiency of the system through enhanced storage efficiency on a persistent storage device.

2. The computer system of claim 1, further comprising: the one or more hardware modules to decrypt the encryption unit, including decrypt the wrapped encryption key with the master key and generate an unwrapped private key.

3. The computer system of claim 2, further comprising the one or more hardware modules to:
   decrypt the requested data into requested plaintext with the unwrapped private key;
   apply an inverse of the one or more advanced data functions to the requested plaintext;
   encrypt the requested plaintext; and
   send the encrypted requested plaintext to an owning entity corresponding to the sub-stream.

4. The computer system of claim 1, further comprising:
   the one or more hardware modules to decrypt the first encryption unit with the private key;
   re-encrypt the data unit; and
   send the encrypted data unit with the master key to a requesting entity.

5. The computer system of claim 1, wherein encrypting the data unit with the wrapped encryption key further comprises the one or more hardware modules to:
   pad any available space in the encryption unit to maintain the fixed size; and
   decrypt the encryption unit based on the encryption key.

6. A computer program product for data encryption, the computer program product comprising a computer readable storage device having program code embodied therewith, the program code executable by a processing unit to:
   separate a received encrypted data stream into a plurality of encrypted data chunks;
   place the plurality of data chunks into a sub-stream;
   decrypt the plurality of data chunks into plaintext through a master key;
   apply one or more advanced data functions to the plaintext to create transformed plaintext;
   organize the transformed plaintext into a data unit, wherein the data unit comprises at least a portion of the plurality of data chunks;
   encrypt the data unit with a wrapped encryption key, the wrapped encryption key comprising the master key and a private key, the private key to encrypt the data unit, the master key associated with an owning entity and to encrypt the private key; and
   create a fixed size encryption unit, the wrapped encryption key stored as metadata for the encryption unit, wherein decryption of the data chunk into plaintext, the application of one or more advanced data functions to the plaintext to create transformed plaintext, organization of the transformed plaintext into a data unit, and encryption of the data unit comprises an improvement to an efficiency of the system through enhanced storage efficiency on a persistent storage device.

7. The computer program product of claim 6, further comprising: program code to decrypt the encryption unit, including decryption of the wrapped encryption key with the master key and generate an unwrapped private key.

8. The computer program product of claim 7, further comprising program code to:

decrypt the requested data into requested plaintext with the unwrapped private key;

apply an inverse of the one or more advanced data functions to the requested plaintext;

encrypt the requested plaintext; and send the encrypted requested plaintext to an owning entity corresponding to the sub-stream.

9. The computer program product of claim 6, further comprising program code to:

decrypt the encryption unit with the private key;

re-encrypt the data unit; and send the encrypted data unit with the master key to a requesting entity.

10. The computer program product of claim 6, wherein encryption of the data unit with the wrapped encryption key further comprises program code to:

pad available space in the encryption unit to maintain the fixed size; and decrypt the encryption unit based on the encryption key.

11. A method comprising:

separating a received encrypted data stream into a plurality of encrypted data chunks;

placing the plurality of data chunks into a sub-stream;

decrypting the plurality of data chunks into plaintext through a master key;

applying one or more advanced data functions to the plaintext and creating transformed plaintext;

organizing the transformed plaintext into a data unit, wherein the data unit comprises at least a portion of the plurality of data chunks;

encrypting the data unit with a wrapped encryption key, the wrapped encryption key comprising the master key and a private key, the private key to encrypt the data unit, the master key associated with an owning entity and to encrypt the private key; and creating a fixed size encryption unit, comprising storing the wrapped encryption key as metadata for the encryption unit, wherein decrypting the data chunk into plaintext, applying one or more advanced data functions to the plaintext and creating transformed plaintext, organizing the transformed plaintext into a data unit, and encrypting the data unit comprises an improvement to an efficiency of the system through enhanced storage efficiency on a persistent storage device.

12. The method of claim 11, further comprising: decrypting the encryption unit, including decrypting the wrapped encryption key with the master key and generating an unwrapped private key.

13. The method of claim 12, further comprising:

decrypting requested data into requested plaintext with the unwrapped private key;

applying an inverse of the one or more advanced data functions to the requested plaintext;

encrypting the requested plaintext; and sending the encrypted requested plaintext to an owning entity corresponding to the sub-stream.

14. The method of claim 11, further comprising:

decrypting the encryption unit with the private key;

re-encrypting the data unit; and sending the encrypted data unit with the master key to a requesting entity.

15. The method of claim 11, wherein encrypting the data unit with the wrapped encryption key further comprises:

padding the encryption unit to attain the fixed size; and decrypting the encryption unit based on the encryption key.

16. The computer system of claim 1, wherein enhanced storage efficiency is at least partially achieved through enhanced data reduction.

17. The computer system of claim 1, wherein an improvement to the efficiency of the system is further attained through a reduction of hardware resource utilization through enhanced efficiency of application of the one or more advanced data functions.

* * * * *